United States Patent Office 3,459,769
Patented Aug. 5, 1969

3,459,769
3-AMINO-A-NOR-B-HOMO-STEROIDS
Georg Anner and Jaroslav Kalvoda, Basel, Switzerland, assignors to Ciba Corporation, New York, N.Y., a corporation of Delaware
No Drawing. Filed Oct. 23, 1965, Ser. No. 504,116
Claims priority, application Switzerland, Nov. 12, 1964, 14,633/64
Int. Cl. C07c *169/54, 173/00;* A61k *27/00*
U.S. Cl. 260—326.14
11 Claims

ABSTRACT OF THE DISCLOSURE

3-amino-A-nor-B-homo-steroids, alphatic-hydrocarbon-substituted in the 17-position. The compounds are useful as tumour inhibiting agents and are also useful as intermediates.

---

The present invention related to the manufacture of new aminosteroids, more especially of 3-amino-A-nor-B-homo-steroids, in the first place those of the formula

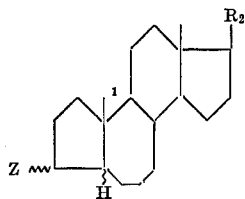

and of their salts, where $R_1$ represents a hydrogen atom or a methyl group, $R_2$ an aliphatic hydrocarbon residue with 8 to 10 carbon atoms, especially a 6-methyl-heptyl-(2),5,6-dimethyl-heptyl-(2) or 5-ethyl-6-methyl-heptyl-(2) residue, which may contain a double bond in the 3,4-position, and Z represents an unsubstituted or substituted amino group.

Substituents suitable for the amino group in position α or β are above all aliphatic residues, such as lower hydrocarbon residues, which may be interrupted by hetero atoms such as oxygen, sulphur or nitrogen. Particularly suitable lower hydrocarbon residues are lower alkyl residues such as methyl, ethyl, propyl or isopropyl; linear or branched butyl, pentyl, hexyl or heptyl residues; lower alkenyl or alkinyl residues such as vinyl, allyl, methallyl, ethinyl or propargyl residues; unsubstituted or alkyl-substituted cycloalkyl or cycloalkenyl groups such as cyclopentyl, cyclohexyl, cycloheptyl, cyclopentyl or cyclohexenyl groups; aralkyl or aralkenyl groups such as phenylmethyl or phentyl residues, or alkenylene groups containing 2 to 7 carbon atoms such as ethylene-(1,2), pentylene-(1,5), butylene-(1,4), 1,5-dimethyl-pentylene-(1,5), hexylene (1,6) or heptylene-(1,5) residues. Residues of this kind that are interrupted by hetero atoms may be, for example, alkoxyalkyl groups such as methoxyethyl or ethoxyethyl groups, oxa-, aza- or thia-alkylene residues, such as 3-aza-,3-oxa-, or 3-thia-pentylene-(1,5) 3-azahexylene-(1,6), 1,5-dimethyl-3-azapentylene-(1,5), 3-methyl-3-azapentylene-(1,5) or 3-hydroxyethyl-3-azapentylene-(1,5) or 3-hydroxyethyl-3-azapentylene-(1,5) residues. The amino group may, however, also contain acyl radicals, especially those of lower aliphatic carboxylic acids.

The amino group may be primary, secondary or tertiary and is especially the free amino group, a dilower alkylamino group such as a dimethylamino, diethylamino, dipropylamino or N-methyl-N-ethylamino group, an N-lower alkyl-N-cycloalkylamino group such as an N-methyl-N-cyclopentyl or cyclohexylamino group, a pyrrolidino, thiamorpholino, piperidino, morpholino or piperazino group, such as the pyrrolidino, piperidino, morpholino, piperaziano, N-methyl-piperazino or N-(β-hydroxyethyl)-piperazino group.

The new compounds possess valuable pharmacological properties. They inhibit the growth of some transplantable rodent tumours, for example Ehrlich carcinoma, adeno carcinoma and uterus epitheliom, and especially of the spontaneous breast cancer of the mouse. They may also be used as intermediates for the manufacture of other compounds having a physiological effect.

Of special value are compounds of the formula

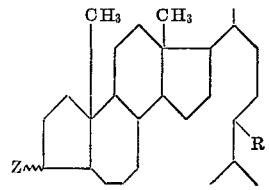

or

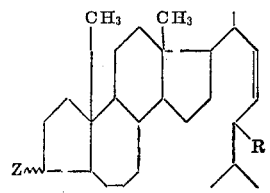

where Z represents the free amino group, a mono- or di-lower alkylamino group or a pyrrolidino, piperidino, morpholino or piperazino group, for example an N-lower alkyl- or N-hydroxy-lower alkyl-piperazino group, and R represents a hydrogen atom or a methyl or ethyl group. 3-amino- and 3-dimethylamino-A-nor-B-homocholestane are particularly potent.

The new compounds are manufactured by known methods. For example, in an A-nor-B-homosteroid containing in position 3 a residue convertible into an amino group the said residue is so converted and, if desired, in a resulting compound a free amino group is converted into a substituted amino group and/or a substituted amino group is converted into a free amino group or into an amino group that is substituted in a different manner.

A residue convertible into an amino group is above all a reactive, esterified hydroxyl group, in the first place a hydroxyl group esterified with a strong inorganic or organic acid, for example a halogen atom, such as a chlorine or bromine atom, or a sulphonyloxy group, e.g. the para toluene- or methane-sulphonyloxy group. The conversion of a reactively esterified hydroxyl group into an amino group is achieved in the usual manner, e.g. by reaction with ammonia or with a primary or secondary amine or with an ammonia donor or amine donor, such as hexa-methylenetetramine, a Schiff's base or a salt of phthalimide. In the last mentioned reactions the condensation product obtained as an intermediate is split, if necessary to a free amine in the usual manner, for example by hydrolysis, or in the case of the phthalimido compounds by hydrazinolysis. The reactions follow the usual practice.

Another residue convertible into an amino group is, for example, a group convertible into the amino group by reduction, e.g. a hydroxyimino, nitro or nitroso group, an imino group or a tautomeric enamino group thereof which may be substituted, for example as indicated above for the amino group, or an azido group. The reduction is performed in the usual manner, above all with catalytically activated hydrogen, such as hydrogen in the presence of a hydrogenating catalyst, e.g. a platinum, nickel or palladium catalyst, such as platinum oxide, Raney nickel or palladium carbon. The groups mentioned above may alternatively be reduced with metals or complex metal hydrides; inter alia, hydroxyimino groups above all may be reduced with sodium in alcohol or sodium amalgam or stannous chloride and hydrochloric acid. Nitro or nitroso groups can be converted into amino groups, for example, by reduction with iron and hydrochloric acid or with aluminum amalgam. The imino groups (Schiff's bases) or corresponding enamine can be reduced, for example, with complex metal hydrides, such as di-light metal hydrides, e.g. lithium aluminum hydride or above all with sodium borohydride. The reactions are carried out in the usual manner. An imino group substituted by an aralkyl radical can first be rearranged with a basic agent, e.g. sodium hydroxide solution or pyridine, to the aralkylideneamino group which can then be hydrolyzed or reduced to the free amino group in the usual manner.

In a resulting final product further substituents can be introduced by known methods within the framework of this invention. Thus, for example, further substituents may be introduced into amino groups containing at least one hydrogen atom, for example by reaction with a reactive ester of a suitable alcohol or by reductive alkylation, that is to say by reaction with a suitable oxo compound followed by reduction. Suitable relevant reactive esters are above all those mentioned above. Preferred reducing agents are catalytically activated hydrogen or di-light metal hydrides, such as sodium borohydride.

Depending on the reaction conditions used the final products are obtained in the free form or in the form of their salts which are likewise included in this invention. The salts of the final products can be converted into the free bases in known manner, e.g. with alkalis or ion exchange resins. Reaction of the free bases with organic or inorganic acids—especially those which are capable of forming therapeutically acceptable salts—gives rise to salts. As such acids there may be mentioned, for example, hydrohalic, sulphuric or phosphoric acids, nitric or perchloric acid; aliphatic, alicyclic, aromatic or heterocyclic carboxylic or sulphonic acids such as formic, acetic, propionic, succinic, glycollic, lactic, malic, tartaric, citric, ascorbic, maleic, hydroxymaleic, pyruvic, phenylacetic, benzoic, para-aminobenzoic, anthranilic, para-hydroxybenzoic, salicylic, para-aminosalicylic acid, embonic, methanesulphonic, ethanesulphonic, hydroxyethanesulphonic, ethylenesulphonic, halogenbenzenesulphonic, toluenesulphonic, naphthalenesulphonic or sulphanilic acid; methionine, tryptophan, lysine or arginine.

The aforementioned or other salts of the new compounds, e.g. the picrates, may also be used for purifying the resulting free bases by converting the base into a salt, isolating the salt and liberating the base again from it. In view of the close relationship between the new compounds in the free form and in the form of their salts what has been said above and hereinafter concerning the free bases refers also to the corresponding salts wherever this is possible and useful.

The invention includes also any modification of the process in which an intermediate obtained at any stage of the process is used as a starting material and any remaining step/steps is/are carried out or the process is discontinued at any stage thereof, or in which the starting materials are formed in situ or the reactants are used in the form of their salts.

The reactions of this invention are performed above all with those starting materials which give rise to the preferred compounds mentioned above.

The A-nor-B-homosteroids, carrying in position 17 an aliphatic hydrocarbon residue containing 8 to 10 carbon atoms, used as starting materials are new and form an object of this invention. They can be manufactured in the known manner, e.g. by irradiating a suitable 3-oxo-4,5-oxidosteroid with ultraviolet light, acylating the 3,6-dioxo-A-nor-B-steroid formed (which is predominantly present in the enol form), and hydrogenating the resulting Δ⁵-3-oxo-6-acyloxy-A-nor-B-homosteroid catalystically, for example in the presence of palladium or palladium carbon. The resulting 6-unsubstituted 3-oxo-A-nor-B-homosteroids may then, if necessary, be reduced in the usual manner, e.g. with lithium aluminium hydride to form the 3-hydroxy compounds. From the latter imino compounds are obtained by reacting a corresponding keto compound with hydroxylamine or with an amine. Starting from the 3-hydroxy compounds, the reactive esters are obtained by known methods.

The new compounds may be used, for example, in the form of pharmaceutical preparations containing them in the free form or in the form of their salts which are likewise included in this invention, in admixture or conjunction with an organic or inorganic, solid or liquid pharmaceutical excipient suitable for enteral or parenteral administration. Suitable excipients are substances that do not react with the new compounds, for example water, gelatin, lactose, starches, stearyl alcohol, magnesium stearate, talcum, vegetable oils, benzylalcohols, gums, propyleneglycols, white petroleum jelly or other known medicinal excipients. The pharmaceutical preparations may be, for example, tablets, dragees or capsules, or in liquid form solutions, suspensions or emulsions. They may be sterilized and/or contain assistants such as preserving, stabilizing, wetting or emulsifying agents, solution promoters, salts for regulating the osmotic pressure or buffers. They may also contain other therapeutically valuable substances. The pharmaceutical preparations are formulated by the conventional methods.

The new compounds may also be used in veterinary medicine, e.g. in one of the abovementioned forms or in the form of feeding stuffs or of additives to feeding stuffs, using, for example, the conventional extenders and diluents or, respectively, feeding stuffs, using, for example, the conventional extenders and diluents or, respectively, feeding stuffs.

The following examples illustrate the invention.

EXAMPLE 1

6.72 g. of 3-oximino-A-nor-B-homocholestane in 340 ml. of glacial acetic acid are reduced at room temperature with hydrogen in the presence of 3.4 g. of platinum oxide. When 2 mols of hydrogen have been absorbed, the catalyst is filtered off and the reaction solution evaporated in a water jet vacuum. The residue is recrystallized from methanol+benzene+ethyl acetate in the presence of traces of acetic acid, to yield 6.4 g. of pure 3-amino-A-nor-B-homocholestane acetate which melts at 173 to 174° C. with decomposition.

The 3-oximino-A-nor-B-homocholestane used as starting material in the above example can be prepared thus:

A solution of 30.0 g. of 3,6-dioxo-A-nor-B-homocholestane in 150 ml. of pyridine and 150 ml. of acetic anhydride is stirred for 14 hours at 40° C. and then left to itself for 2 days at 20° C., then poured into 2.5 litres of ice water, stirred for 30 minutes, filtered, the amorphous residue is taken up in ether and rinsed with water. The washings are extracted with ether, and the combined ethereal extracts are dried over sodium sulphate and evaporated in a water jet vacuum. The resulting crude, yellowish Δ⁵-3-oxo-6-acetoxy-A-nor-B-homocholestene (yield about 35 g.) is dissolved in 2.5 litres of ethyl acetate, 12 g. of 10% palladium carbon are added and the batch is hydrogenated with hydrogen until the absorption of hydrogen ceases (about 80% of theory).

The catalyst is filtered off and the filtrate evaporated in a water jet vacuum. After two recrystallizations from methylene chloride+ether there are obtained 4.0 g. of pure 3-oxo-A-nor-B-homocholestane melting at 123° C. Optical rotation $[\alpha]_D^{20} = -80° \pm 5°$ (0.2% dioxane). Chromatography of the mother liquor on silica gel (eluant: 95:5-mixture of benzene and ethyl acetate) yields another 3.59 g. of the same compound. Further chromatogram fractions yield after recrystallization from ether+acetone+methanol 5.7 g. of pure 3-oxo-6-acetoxy-A-nor-B-homocholestane melting at 115° C., which by adsorption on alumina loses one mol of acetic acid and is transformed into Δ⁵-3-oxo-A-nor-B-homocholestane which on hydrogenation under the conditions described above gives a yield of 80% of the saturated 3-oxo-A-nor-B-homocholestane described above.

7.7 g. of this compound, 23.0 g. of hydroxylamine hydrochloride and 23.0 g. of sodium acetate are suspended in 380 ml. of methanol and refluxed with stirring for 14 hours. The solution is then concentrated in a water jet vacuum, mixed with water, and the precipitated product is filtered off and dissolved in methylene chloride; the solution is dried over sodium sulphate and evaporated in a water jet vacuum. The residue is recrystallized from methylene chloride+ether+petroleum ether, to yield 6.72 g. of pure 3-oximino-A-nor-B-homocholestane melting at 180 to 181° C.

EXAMPLE 2

3.0 g. of the 3-amino-A-nor-B-homocholestane acetate obtained in Example 1 are dissolved in 50 ml. of 98% formic acid, mixed with 50 ml. of 40% formaldehyde, heated for 3½ hours at 100° C. and then allowed to cool. The reaction solution is stirred into ½ litre of ice water, mixed portionwise while being cooled with 65 g. of sodium hydroxide; the suspension formed is extracted with ether, the ethereal solution is washed with water, the washing waters are extracted with ether, and the combined ethereal solutions are dried over sodium sulphate and sodium hydroxide. Evaporation in a water jet vacuum and recrystallization from ether+acetone yields 2.24 g. of pure 3-dimethylamino-A-nor-B-homocholestane melting at 72 to 73° C.

EXAMPLE 3

400 mg. of 3-amino-A-nor-B-homo-cholestane acetate (prepared, for example, as described in Example 1) are dissolved in 50 ml. of water and 2 N-sodium hydroxide solution is added until the solution gives a strong basic reaction, whereupon it is extracted with ether, to yield 340 mg. of a colourless oil which crystallizes slowly. The resulting 3-amino-A-nor-B-homocholestane is suspended (without first being purified) in 3 ml. of acetic anhydride, and the mixture is heated for 20 minutes at 70° C., then worked up in the usual manner, to yield 200 mg. of a colourless oil which according to the thin-layer chromatographic examination (eluant:benzene+methanol 8:2) consists of pure 3-acetylamino-A-nor-B-homocholestane which in the infrared spectrum displays bands, inter alia, at 2.95, 6.00 and 6.65μ. When this compound is reduced with lithium aluminium hydride in tetrahydrofuran, 3-ethylamino-A-nor-B-homocholestane is obtained.

EXAMPLE 4

1.0 g. of para-toluenesulphonylchloride is added to a solution of 1.0 g. of 3 "α"-hydroxy-A-nor-B-homocholestane in 5 ml. of pyridine. The solution is kept for 18 hours at 20° C., to yield after usual working up 1.2 g. of crude tosylate which is heated (without previous purification) with 15 ml. of dimethylamine in an autoclave for 8 hours at 100° C. The excess dimethylamine is evaporated, the residue taken up in ether, the batch is separated in the usual manner into a basic and a neutral phase, and the basic crude product is crystallized to yield 450 mg. of pure 3-dimethylamino-A-nor-homocholestane melting at 70 to 72° C.

The 3 "α"-hydroxy-A-nor-B-homocholestane used in this example can be prepared thus:

500 mg. of 3-oxo-A-nor-B-homocholestane in 26 ml. of tetrahydrofuran are stirred dropwise into a suspension of 250 mg. of lithium aluminium hydride in 25 ml. of absolute tetrahydrofuran. The reaction mixture is refluxed for one hour, and while cooling it at about −5° C., the excess reducing agent is decomposed by adding 0.6 ml. of water in 5 ml. of tetrahydrofuran; 6.0 g. of anhydrous sodium sulphate are added, and the inorganic phase of the reaction solution is filtered off. The filter residue is washed with tetrahydrofuran and ether, and the filtrates are combined and evaporated in a water jet vacuum. In this manner there are obtained 510 mg. of crude product which can be separated into two compounds by chromatography on 25 g. of silica gel. On elution with benzene, there are obtained 244 mg. of 3 "β"-hydroxy-A-nor-B-homocholestane which, after recrystallization from acetone, melts at 99 to 100° C. Elution with 95:5-mixture of benzene+ethyl acetate yields, in addition to neutral fraction, 50 mg. of 3 "α"-hydroxy-A-nor-B-homocholestane which, after recrystallization from acetone, melts at 116° C.

What is claimed is:

1. Compounds of the formula

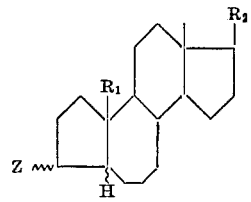

and therapeutically acceptable acid addition salts thereof, wherein $R_1$ is hydrogen or methyl, $R_2$ represents an aliphatic hydrocarbon residue with 8 to 10 carbon atoms and Z stands for a mono-lower alkylamino group.

2. Therapeutically acceptable acid addition salts of the compounds claimed in claim 1.

3. Compounds of the formula given in claim 1 wherein $R_2$ represents the 6-methyl-heptyl-(2), the 5,6-dimethyl-heptyl-(2) or the 5-ethyl-6-methyl-heptyl-(2)- residue or such a residue containing a double bond in 3,4-position.

4. Therapeutically acceptable acid addition salts of the compounds claimed in claim 3.

5. Compounds of the formula

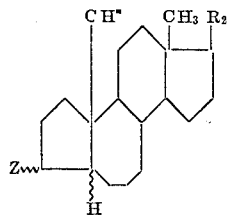

wherein $R_2$ represents the 6-methyl-heptyl-(2), the 5,6-dimethyl-heptyl - (2) or the 5-ethyl-6-methyl-heptyl-(2)-residue or such a residue containing a double bond in 3,4-position, and Z stands for a primary amino group, a mono-lower alkylamino group, a di-lower alkylamino group or an N-lower alkyl-N-cycloalkylamino group.

6. Compounds of the formula

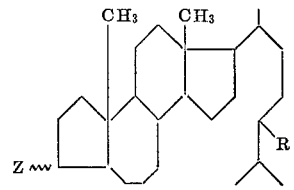

wherein R stands for hydrogen, methyl or ethyl and Z represents a free amino group or a mono- or di-lower alkylamino group.

7. Compounds of the formula

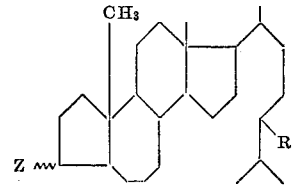

wherein R stands for hydrogen, methyl or ethyl and Z represents a free amino group or a mono- or di-lower alkylamino group.

8. The 3-amino-A-nor-B-homo-cholestan and therapeutically acceptable acid addition salts thereof.

9. The 3 - dimethylamino-A-nor-B-homo-cholestan and therapeutically acceptable acid addition salts thereof.

10. The 3-methylamino-A-nor-B-homo-cholestan and therapeutically acceptable acid addition salts thereof.

11. The 3 - ethylamino-A-nor-B-homo-cholestan and therapeutically acceptable acid addition salts thereof.

References Cited

Shoppee et al., Chem. Ab., vol. 55, 1961.
D. N. Hall, Chem. Ab., vol. 63, 1965.

FLOYD D. HIGEL, Primary Examiner

P. C. IVES, Assistant Examiner

U.S. Cl. X.R.

204—162; 260—243, 247, 268, 293, 313, 319, 326, 343, 468, 501, 561, 563, 566, 570, 586, 617; 424—274, 303, 305, 330

CASE 5574/E

PO-1050
(5/69)

UNITED STATES PATENT OFFICE
CERTIFICATE OF CORRECTION

Patent No. 3,459,769          Dated August 5, 1969

Inventor(s) GEORG ANNER ET AL

It is certified that error appears in the above-identified patent and that said Letters Patent are hereby corrected as shown below:

Column 6, lines 37 to 46, amend the left hand side of the formula to read:

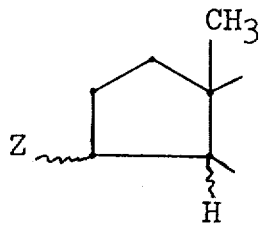

SIGNED AND
SEALED
JAN 5 1971

(SEAL)
Attest:

Edward M. Fletcher, Jr.
Attesting Officer

WILLIAM E. SCHUYLER, JR.
Commissioner of Patents